(12) United States Patent
Scheepens et al.

(10) Patent No.: US 11,500,756 B2
(45) Date of Patent: Nov. 15, 2022

(54) PROCESS TREE DISCOVERY USING A PROBABILISTIC INDUCTIVE MINER

(71) Applicant: UiPath, Inc., New York, NY (US)

(72) Inventors: Roeland Johannus Scheepens, Eindhoven (NL); Dennis Brons, Eindhoven (NL); Dirk Fahland, Eindhoven (NL)

(73) Assignee: UiPath, Inc., New York, NY (US)

( * ) Notice: Subject to any disclaimer, the term of this patent is extended or adjusted under 35 U.S.C. 154(b) by 208 days.

(21) Appl. No.: 17/013,624

(22) Filed: Sep. 6, 2020

(65) Prior Publication Data

US 2022/0075705 A1 Mar. 10, 2022

(51) Int. Cl.
*G06F 11/00* (2006.01)
*G06F 11/34* (2006.01)
(Continued)

(52) U.S. Cl.
CPC .......... *G06F 11/3476* (2013.01); *G06F 9/451* (2018.02); *G06F 16/9024* (2019.01); *G06Q 10/067* (2013.01); *G06Q 10/0633* (2013.01)

(58) Field of Classification Search
CPC ............ G06F 11/3476; G06F 11/3447; G06F 11/079; G06F 11/3452; G06F 11/3636; G06F 11/3466; G06F 11/323
See application file for complete search history.

(56) References Cited

U.S. PATENT DOCUMENTS 11,070,573 B1 * 7/2021 Edwards ............... G06F 21/552
2004/0128001 A1 7/2004 Levin et al.
(Continued)

FOREIGN PATENT DOCUMENTS

CN 109033368 A 12/2018
CN 109460391 A 3/2019
(Continued)

OTHER PUBLICATIONS

Process discovery using in-database minimum self distance abstractions, Alifah Syamsiyah & Sander J J Leemans, Mar. 30, 2020, SAC '20: Proceedings of the 35th Annual ACM Symposium on Applied Computing, pp. 26-35 (Year: 2020).*

(Continued)

*Primary Examiner* — Charles Ehne
(74) *Attorney, Agent, or Firm* — Chiesa Shahinian & Giantomasi PC

(57) ABSTRACT

Systems and methods for generating a process tree of a process are provided. An event log of the process is received. It is determined whether a base case applies to the event log and, in response to determining that the base case applies to the event log, one or more nodes are added to the process tree. In response to determining that the base case does not apply to the event log, the event log is split into sub-event logs based on a frequency of directly follows relations and a frequency of strictly indirectly follows relations for pairs of activities in the event log and one or more nodes are added to the process tree. The steps of determining whether a base case applies and splitting the event log are repeatedly performed for each respective sub-event log using the respective sub-event log as the event log until it is determined that the base case applies to the event log. The process tree is output. The process may be a robotic process automation process.

35 Claims, 9 Drawing Sheets

(51) Int. Cl.
*G06F 9/451* (2018.01)
*G06F 16/901* (2019.01)
*G06Q 10/06* (2012.01)

(56) References Cited

U.S. PATENT DOCUMENTS

| | | |
|---|---|---|
| 2004/0260590 A1 | 12/2004 | Golani et al. |
| 2009/0112667 A1 | 4/2009 | Blackwell et al. |
| 2014/0172919 A1* | 6/2014 | Johnston ............... G06F 11/366 707/797 |
| 2015/0254158 A1 | 9/2015 | Puri et al. |
| 2017/0111245 A1 | 4/2017 | Ishakian et al. |
| 2017/0286190 A1 | 10/2017 | Ishakian et al. |
| 2019/0050317 A1 | 2/2019 | Melville et al. |
| 2019/0286504 A1 | 9/2019 | Muntes-Mulero et al. |
| 2019/0370102 A1* | 12/2019 | Settle ................... G06F 11/0781 |
| 2020/0193094 A1 | 6/2020 | Topol |
| 2020/0272531 A1* | 8/2020 | Johnston ............. G06F 11/0775 |
| 2021/0382770 A1 | 12/2021 | Lu et al. |

FOREIGN PATENT DOCUMENTS

| | | |
|---|---|---|
| KR | 10-2020-0058123 A | 5/2020 |
| WO | 2018138601 A1 | 8/2018 |
| WO | 2020124240 A1 | 6/2020 |

OTHER PUBLICATIONS

International Search Report and Written Opinion dated Jun. 4, 2021, in connection with International Patent Application No. PCT/US2020/055646, filed Oct. 15, 2020, 9 pgs.

Augusto et al., "Split Miner: Automated Discovery of Accurate and Simple Business Process Models from Event Logs," May 15, 2018, 34 pgs.

Leemans et al., "Discovering Block-Structured Process Models from Event Logs—A Constructive Approach," 2013, Application and Theory of Petri Nets and Concurrency, pp. 311-329.

Van der Aalst, "Process Mining, Data Science in Action," Second Edition, 2016, vol. 5, 477 pgs.

Leemans et al., "Exploring Processes and Deviations," In Lecture Notes in Business Information Processing, 2015, pp. 304-316.

Leemans, "Robust Process Mining with Guarantees," 2018, Proceedings of the Dissertation Award, Demonstration, and Industrial Track at BPM 2018. Sun SITE. pp. 46-50.

Leemans et al., "Scalable Process Discovery with Guarantees," 2015, Enterprise, Business-Process and Information Systems Modeling, pp. 85-101.

Leemans et al., "Discovering Block-Structured Process Models from Incomplete Event Logs," 2014, Application and Theory of Petri Nets and Concurrency, pp. 91-110.

Leemans et al., "Scalable Process Discovery and Conformance Checking," 2018, Software & Systems Modeling vol. 17, pp. 599-631.

Leemans et al., "Discovering Block-Structured Process Models from Event Logs Containing Infrequent Behaviour," 2013, Business Process Management Workshops, pp. 66-78.

Leemans et al., "Using Life Cycle Information in Process Discovery," 2016, Business Process Management Workshops, pp. 204-217.

Vanhatalo et al., "The Refined Process Structure Tree," Sep. 2009, Data & Knowledge Engineering, vol. 68, Issue 9, pp. 793-818.

Van der Aalst et al., "Workflow Mining: Discovering Process Models from Event Logs," Sep. 2004, IEEE Transactions on Knowledge and Data Engineering, vol. 16, Issue 9, pp. 1128-1142.

International Search Report dated Feb. 18, 2022, in connection with International Patent Application No. PCT/JS2021/072196, filed Nov. 3, 2021, 10 pgs.

International Search Report dated Feb. 23, 2022, in connection with International Patent Application No. PCT/US2021/072197, filed Nov. 3, 2021, 9 pgs.

Syamsiyah et al., "Process discovery using in-database minimum self distance abstractions," 2020, SAC '20 Proceedings of the 35th Annual ACM Symposium on Applied Computing, pp. 26-35.

Vanden Broucke et al., "Fodina: A robust and flexible heuristic process discovery technique," 2017, Decision Support Systems, vol. 100, pp. 109-118.

Augusto et al., "Split Miner: Discovering Accurate and Simple Business Process Models from Event Logs," 2017, IEEE International Conference on Data Mining (ICDM), 10 pgs.

Brons et al., "Striking a new Balance in Accuracy and Simplicity with the Probabilistic Inductive Miner," 2021, IEEE International Conference on Process Mining (ICPM) 2021, 10 pgs.

Non-Final Office Action dated Aug. 9, 2022, in connection with U.S. Appl. No. 17/161,725, filed Jan. 29, 2021, 13 pgs.

Medeiros et al., "Process Mining based on Clustering: A Quest for Precision," 2018, Business Process Management Workshops. BPM 2007. Lecture Notes in Computer Science book series, vol. 4928, 12 pgs.

Notice of Allowance and Fee(s) Due dated Aug. 17, 2022, in connection with U.S. Appl. No. 17/161,729, 11 pgs.

* cited by examiner

PROCESS TREE DISCOVERY USING A PROBABILISTIC INDUCTIVE MINER

TECHNICAL FIELD

The present invention relates generally to computer process mining, and more particularly to process tree discovery using a probabilistic inductive miner for generating process trees of computer processes that are usable, understandable, and accurate.

BACKGROUND

Computer processes are sequences of activities executed by one or more computers to provide various services. In process mining, process model discovery techniques are applied for generating process models that represent execution of processes. Existing process model discovery techniques generate formal process models capable of expressing complex behavior such as parallelism. However, existing process model discovery techniques generate process models that are too complex to be utilized in many applications.

BRIEF SUMMARY OF THE INVENTION

In accordance with one or more embodiments, systems and methods for generating a process tree of a process are provided. An event log of the process is received. It is determined whether a base case applies to the event log and, in response to determining that the base case applies to the event log, one or more nodes are added to the process tree. In response to determining that the base case does not apply to the event log, the event log is split into sub-event logs based on a frequency of directly follows relations and a frequency of strictly indirectly follows relations for pairs of activities in the event log and one or more nodes are added to the process tree. The steps of determining whether a base case applies and splitting the event log are repeatedly performed for each respective sub-event log using the respective sub-event log as the event log until it is determined that the base case applies to the event log. The process tree is output. The process may be a robotic process automation process.

In one embodiment, the event log is split by generating a directly follows graph of the event log and an indirectly follows graph of the event log, filtering the directly follows graph and the indirectly follows graph, calculating activity relation scores for relationship operators for pairs of activities in the event log based on the filtered directly follows graph and the filtered indirectly follows graph, determining, based on the activity relation scores, 1) a cut location in the event log and 2) a relationship operator node representing behavior between the sub-event logs, and splitting the event log into the sub-event logs based on the cut location.

In one embodiment, the directly follows graph and the indirectly follows graph are filtered by sorting pairs of activities in the event log that are in directly follows relation or strictly indirectly follows relation, identifying pairs of activities in the sorted pairs of activities based on a filter threshold value, and removing edges connecting the identified pairs of activities in the directly follows graph and the indirectly follows graph. The filter threshold value may be user defined.

In one embodiment, the cut location and the relationship operator node are determined by calculating cut scores for potential cut locations based on the activity relation scores and determining, based on the cut scores, 1) the cut location from the potential cut locations and 2) the relationship operator node.

In one embodiment, splitting the event log into sub-event logs based on a frequency of directly follows relations and a frequency of strictly indirectly follows relations for pairs of activities in the event log and adding one or more nodes to the process tree includes adding a relationship operator node representing behavior between the sub-event logs and a child node of the relationship operator node for each of the sub-event logs.

In one embodiment, determining whether a base case applies to the event log and, in response to determining that the base case applies to the event log, adding one or more nodes to the process tree includes determining that a skip log case applies to the event log and, in response to determining that the skip log case applies to the event log, an exclusive choice node is added to the process tree with a first child node representing a silent activity and a second child node for the event log.

In one embodiment, a process model may be generated based on the process tree.

These and other advantages of the invention will be apparent to those of ordinary skill in the art by reference to the following detailed description and the accompanying drawings.

DETAILED DESCRIPTION

Figure 1:
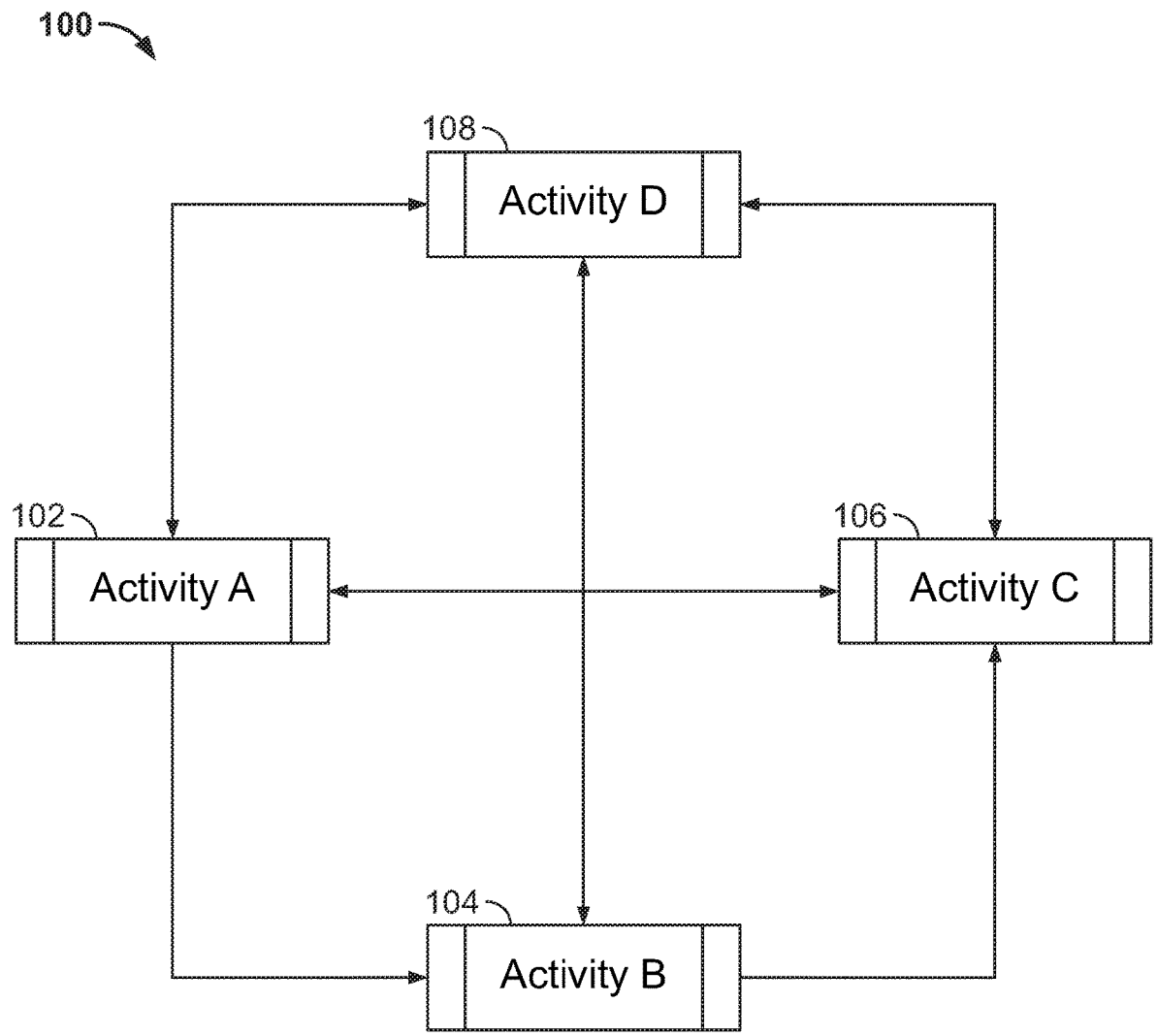
FIG. 1 shows an illustrative process in accordance with one or more embodiments of the invention.

Computer processes may be executed by one or more computers to provide services for a number of different applications, such as, e.g., administrative applications (e.g., onboarding a new employee), procure-to-pay applications (e.g., purchasing, invoice management, and facilitating payment), and information technology applications (e.g., ticketing systems). An exemplary process 100 is shown in FIG. 1. In one embodiment, process 100 may be implemented as a robotic process automation (RPA) workflow for automatically performing a task using one or more RPA robots.

Process 100 comprises Activity A 102, Activity B 104, Activity C 106, and Activity D 108, which represent a predefined sequence of steps in process 100. As shown in FIG. 1, process 100 is modeled as a directed graph where each activity 102-108 is represented as a node and each transition between activities 102-108 is represented as edges connecting the nodes. The transition between activities represents the execution of process 100 from a source activity to a destination activity. Execution of process 100 is recorded in the form of an event log.

Embodiments described herein provide for a probabilistic inductive miner system for recursively generating a process tree representing execution of a process, such as, e.g., process 100, based on an event log. In one embodiment, an event log is repeatedly and recursively split into sub-event logs. For each split, a relationship operator node is added to the process tree representing the behavior, such as, e.g., exclusive choice, sequence, parallel, or loop, between the sub-event logs. Activity nodes are recursively added for both sub-event logs as children to the relationship operator node. Before attempting to find a split in the event log, it is first determined whether a base case applies, in which case a leaf node is added representing either an activity of the process or a silent activity. This process is recursively performed for each sub-event log to provide for the recursive addition of nodes to a process tree to thereby generate the process tree representing execution of the process. Advantageously, such process trees generated in accordance with embodiments described herein may be utilized to generate process models (e.g., BPMN (business process model and notation) like models) of the process that are usable, understandable, and accurate.

Figure 2:
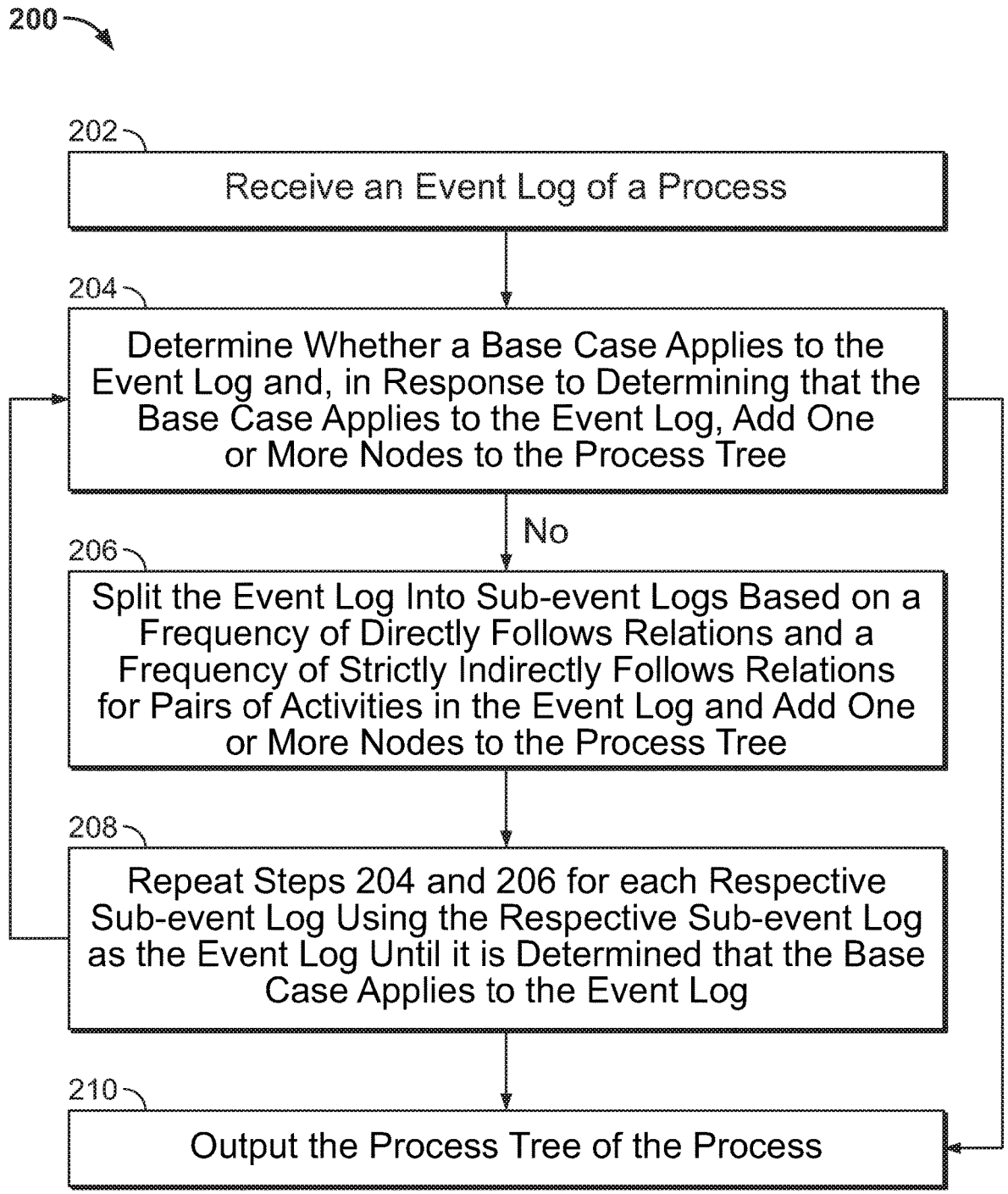
FIG. 2 shows a method for generating a process tree of a process, in accordance with one or more embodiments of the invention.

FIG. 2 shows a method 200 for generating a process tree of a process, in accordance with one or more embodiments. Various steps of method 200 are recursively performed to iteratively add nodes to the process tree to thereby generate the process tree. Method 200 will be described with continued reference to process 100 of FIG. 1. In one embodiment, the steps of method 200 are performed to generate a process tree for process 100 of FIG. 1. Method 200 may be performed by one or more suitable computing devices, such as, e.g., computing system 900 of FIG. 9.

At step 202, an event log of the process is received. The event log, denoted L, may be maintained during one or more instances of execution of the process by recording events occurring during the one or more instances of execution of the process. An event refers to the execution of an activity at a particular time and for a particular case. A case corresponds to a particular instance of execution of the process and is identified by a case identifier (ID). A trace refers to an ordered sequence of activities executed for a case. A variant refers to a frequency of occurrence of a particular trace.

Figure 3:
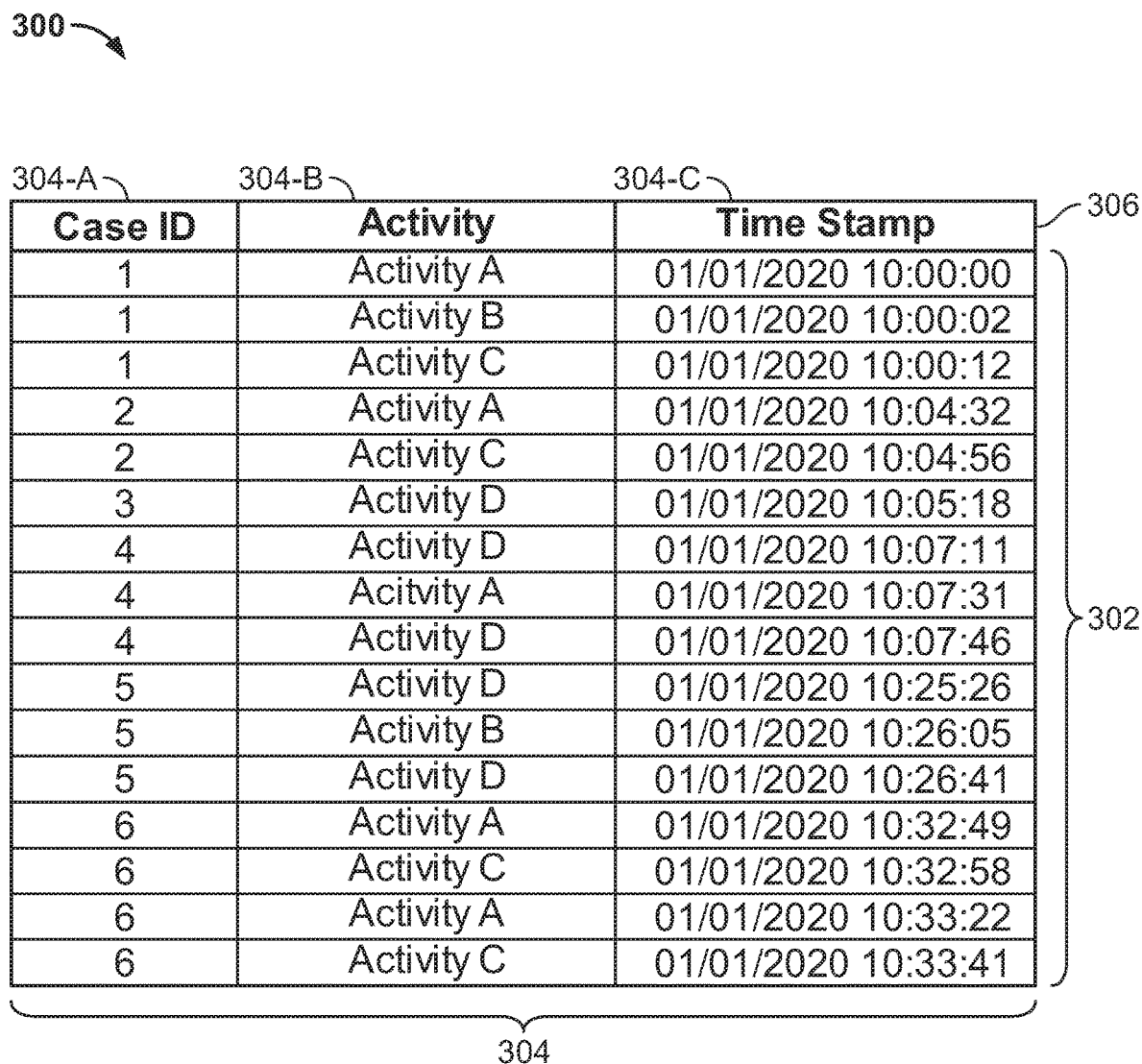
FIG. 3 shows an exemplary event log of the process shown in FIG. 1, in accordance with one or more embodiments of the invention.

FIG. 3 shows an exemplary event log 300 of process 100 of FIG. 1, in accordance with one or more embodiments. Event log 300 records events occurring during six instances of execution of process 100, corresponding to case ID 1 through case ID 6 in event log 300. As shown in FIG. 3, event log 300 is formatted as a table having rows 302 each corresponding to an event and columns 304 each identifying an attribute of the event, identified in header row 306, at a cell at which rows 302 and columns 304 intersect. In particular, each row 302 is associated with an event representing the execution of an activity 102-108 (identified in column 304-B), a time stamp of the execution of the activity 102-108 (identified in column 304-C), and a case ID identifying the instance of execution of the executed activity 102-108 (identified in column 304-A). In one embodiment, the time stamp of the execution of the activity 102-108, identified in column 304-C, refers to the time at which execution of the activity 102-108 completed, but may alternatively refer to the time at which execution of the activity 104-108 started. It should be understood that event log 300 may be in any suitable format and may include additional columns 304 identifying other attributes of events.

At step 204, it is determined whether a base case applies to the event log. A base case is a condition and may include, e.g., a single activity case, a no activity case, or a skip log case. The single activity case applies to the event log when the event log includes only a single activity. The no activity case applies to the event log when the event log does not include any activities. The skip log case applies to the event log when the number of empty traces of the event log that would have been produced exceeds a number of traces of the event log, indicating that the event log was skipped more often than it was executed. The number of empty traces in the event log that would have been produced is tracked by an empty behavior counter and is not included in the number of traces of the event log. It should be understood that the base case is not limited to a single activity case, a no activity case, or a skip log case. Other base cases are also contemplated.

In response to determining that a base case applies to the event log, one or more nodes are added to the process tree. For instance, in response to determining that a single activity case applies to the event log, a node representing that activity is added to the process tree. In response to determining that a no activity case applies to the event log, a leaf node representing a silent activity is added to the process tree. The silent activity indicates that "nothing" happens. In response to determining that a skip log case applies to the event log, an exclusive choice operator node is added to the process tree with two child nodes. The first child node is a leaf node representing a silent activity. The second child node is a node for the event log added by resetting the empty behavior counter and returning to step 204 to determine whether a base case applies to the event log.

The process tree is stored in memory (e.g., in memory 906 of computing system 900 of FIG. 9) while being generated during method 200 to enable the recursive addition of nodes in a node-by-node manner by recursively and repeatedly performing steps 204 and 206.

At step 206, in response to determining that the base case does not apply to the event log, the event log is split into sub-event logs based on a frequency of directly follows relations and a frequency of strictly indirectly follows relations for pairs of activities in the event log and one or more nodes are added to the process tree. The nodes added to the process tree include 1) a relationship operator node representing the behavior (e.g., exclusive choice, sequence, parallel, or loop) between the sub-event logs and 2) a child node for each sub-event log. The specific nodes of the child nodes are determined by recursively returning to step 204 (at step 208) and repeating steps 204 and 206 for each respective sub-event log. In one embodiment, the event log is split into sub-event logs and the relationship operator node is determined according to the steps of method 500 of FIG. 5, described in detail below.

At step 208, method 200 returns to step 204 and steps 204 and 206 are repeated for each respective sub-event log using the respective sub-event log as the event log until it is determined that the base case applies to the event log (at step 204). In this manner, method 200 recursively adds one or more nodes to the process tree for each sub-event log to thereby generate the process tree.

Figure 4:
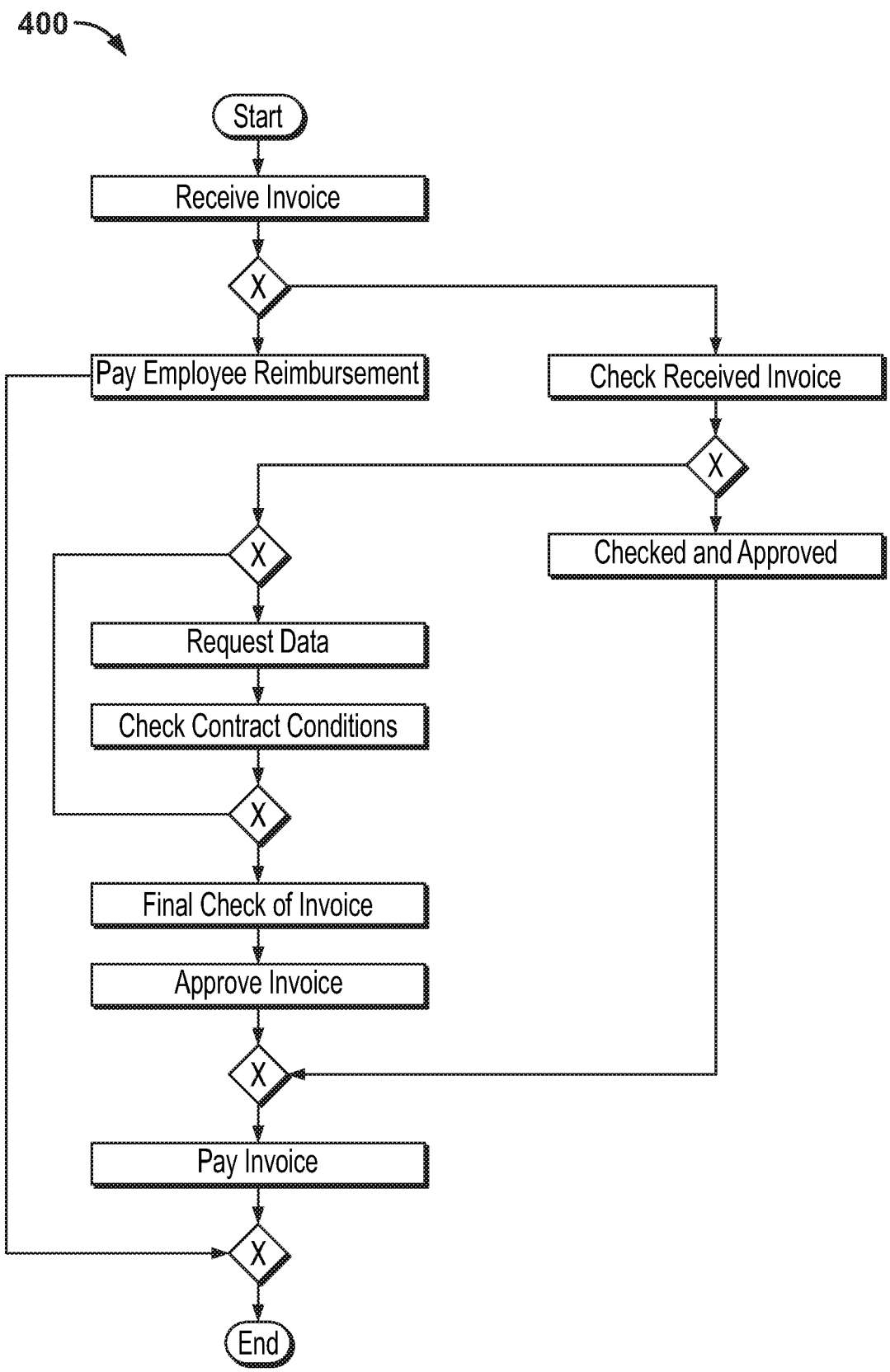
FIG. 4 shows an illustrative process tree representing execution of a process, in accordance with one or more embodiments of the invention.

At step 210, the process tree of the process is output. The process tree is output once steps 204 and 206 have been performed for all sub-event logs. In one embodiment, the process tree may be output by, for example, displaying the process tree on a display device of a computer system, storing the process tree on a memory or storage of a computer system, or by transmitting the process tree to a remote computer system. FIG. 4 shows an illustrative process tree 400 representing execution of a process, generated in accordance with one or more embodiments.

In some embodiments, the process tree may be converted to a process model, e.g., using known techniques. The process model may be, for example, a BPMN model or BPMN-like model.

Figure 5:
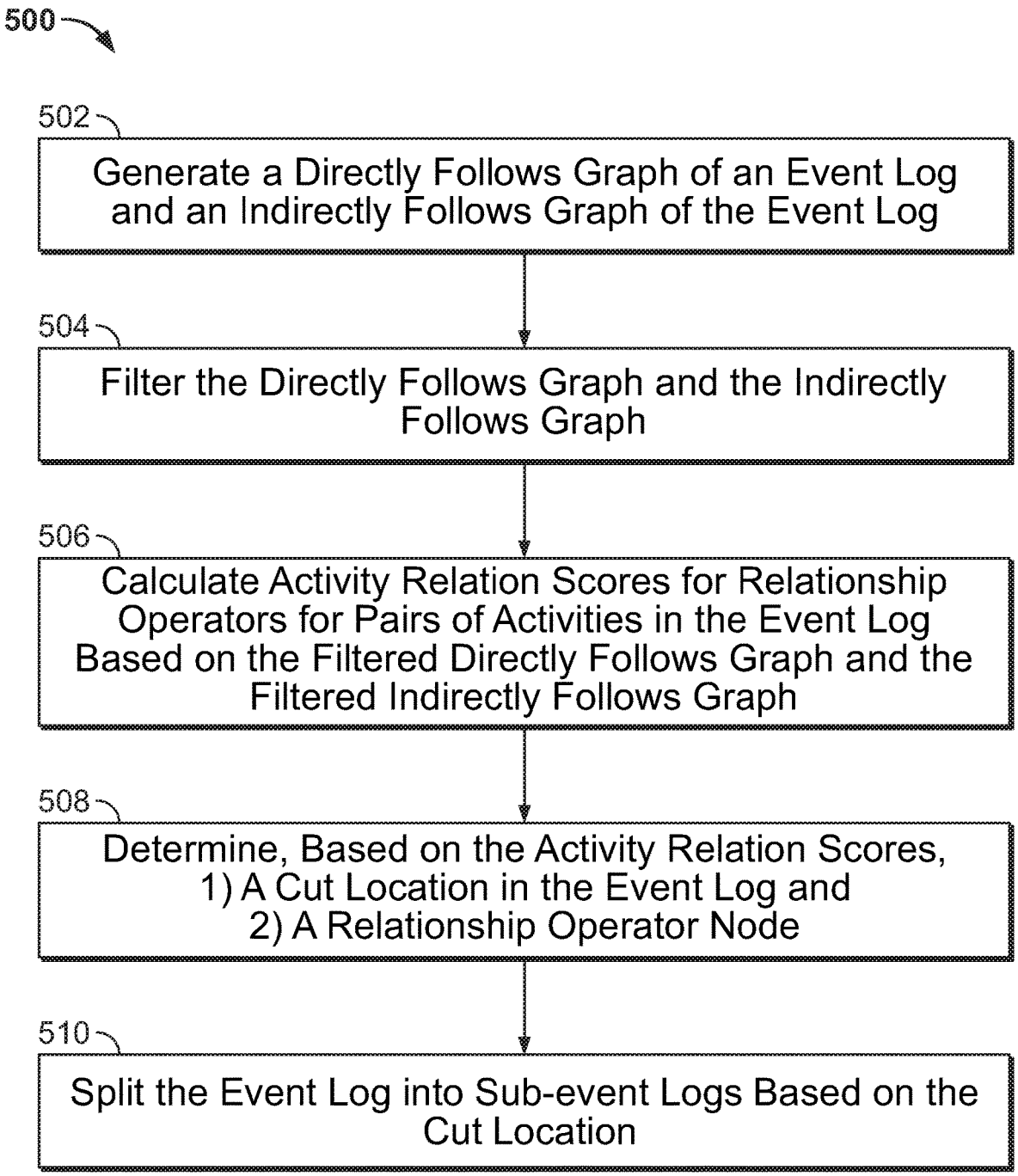
FIG. 5 shows a method for splitting an event log of a process into sub-event logs, in accordance with one or more embodiments of the invention.

FIG. 5 shows a method 500 for splitting an event log of a process into sub-event logs, in accordance with one or more embodiments. In one embodiment, the steps of method 500 are performed at step 206 of FIG. 2 to split an event log, such as, e.g., the event log of process 100 of FIG. 1, into sub-event logs and to determine a relationship operator node representing the behavior between the sub-event logs. Method 500 may be performed by one or more suitable computing devices, such as, e.g., computing system 900 of FIG. 9.

At step 502, a directly follows graph of an event log and an indirectly follows graph of the event log are generated. A directly follows graph is a directed graph comprising nodes denoting activities and edges connecting nodes of activities that are in directly follows relation. An indirectly follows graph is a directed graph comprising nodes denoting activities and edges connecting nodes of activities that are in strictly indirectly follows relation. As used herein, directly follows relation refers to activities that directly follow each other and strictly indirectly follows relation refers to activities that indirectly follow each other but do not directly follow each other.

Figure 6:
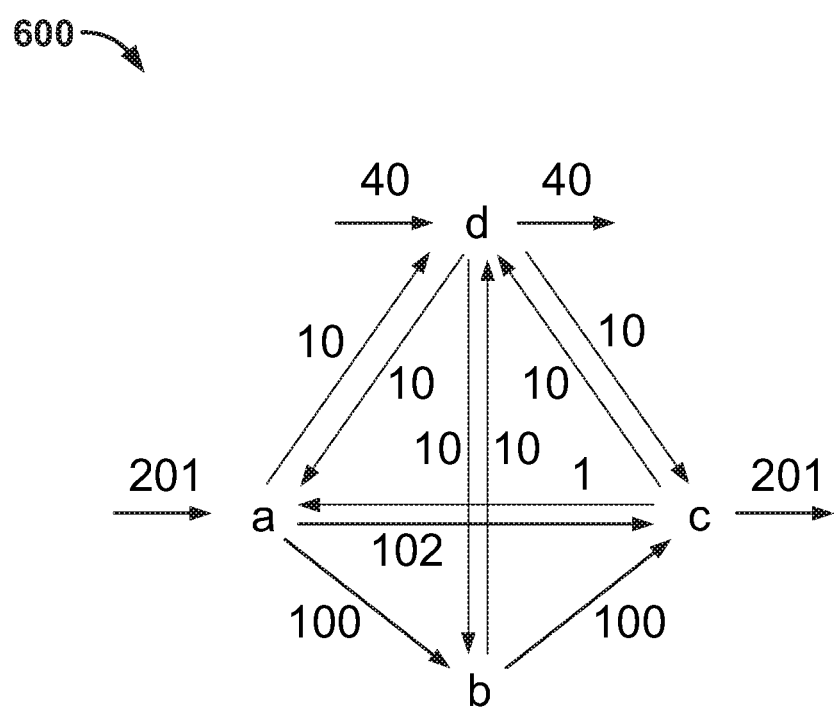
FIG. 6 shows an exemplary directly follows graph of the process shown in FIG. 1, in accordance with one or more embodiments of the invention.

FIG. 6 shows an exemplary directly follows graph 600 of process 100 of FIG. 1, in accordance with one or more embodiments. Directly follows graph 400 depicts nodes for Activity A 102, Activity B 104, Activity C 106, and Activity D 108 and edges connecting nodes of activities that directly follow each other. Each edge is annotated with a value indicating a frequency of occurrence.

At step 504, the directly follows graph and the indirectly follows graph are filtered. The removal of infrequent edges and nodes from the directly follows graph and the indirectly follows graphs results in the generation of less complex process trees, while maintaining more frequent data. Further, filtering the directly follows graph and the indirectly follows graph avoids the removal of infrequent variants that includes frequent activities, which would occur if the event log was directly filtered.

In one embodiment, the directly follows graph and the indirectly follows graph are filtered by sorting pairs of activities (illustratively denoted a and b) in the event log that are in directly follows relation (denoted a→b) or strictly indirectly follows relation (denoted a→*b). The pairs of activities are sorted based on the frequency of occurrence that they are in either directly follows relation or indirectly follows relation (respectively denoted |a→b| and |a→*b|), which are determined from the directly follows graph and the indirectly follows graph, respectively. Pairs of activities are then identified in the sorted pairs of activities based on a filter threshold value f. Edges connecting the identified pairs of activities are removed in the directly follows graph and the indirectly follows graph. For example, the top (100−f) percent of the sorted pairs of activities (i.e., the most infrequent pairs of activities) may be identified and edges connecting the identified pairs of activities are removed from the directly follows graph and the indirectly follows graph. In one embodiment, the filter threshold value f is a user defined value received from user input. Such a user defined filter threshold value f allows for varying levels of model complexity as defined by the user. In one embodiment, when edges removed from the directly follows graph results in a node unconnected to that graph, that node is also removed from the graph.

Figure 7A:
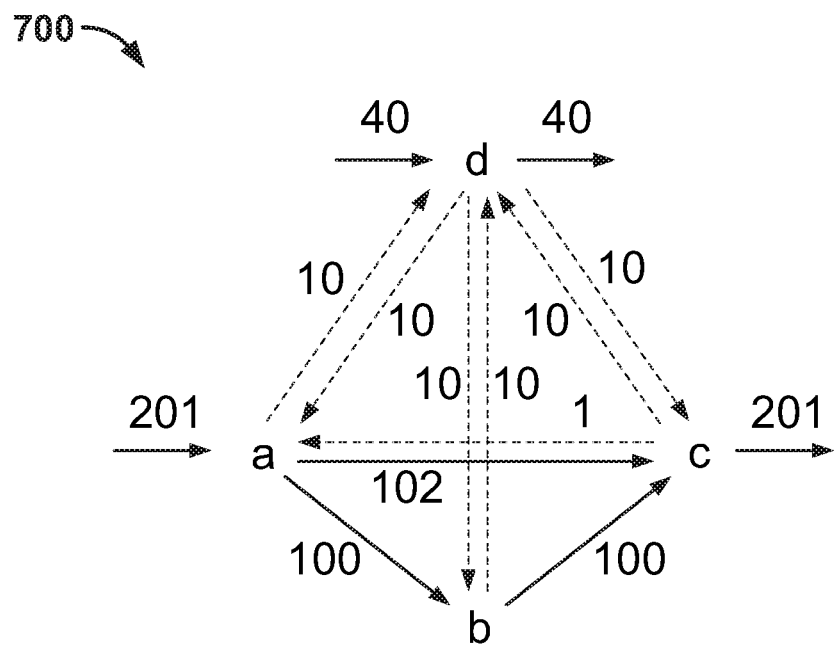
FIG. 7A shows a filtered graph of the directly follows graph shown in FIG. 6, in accordance with one or more embodiments of the invention.
Figure 7B:
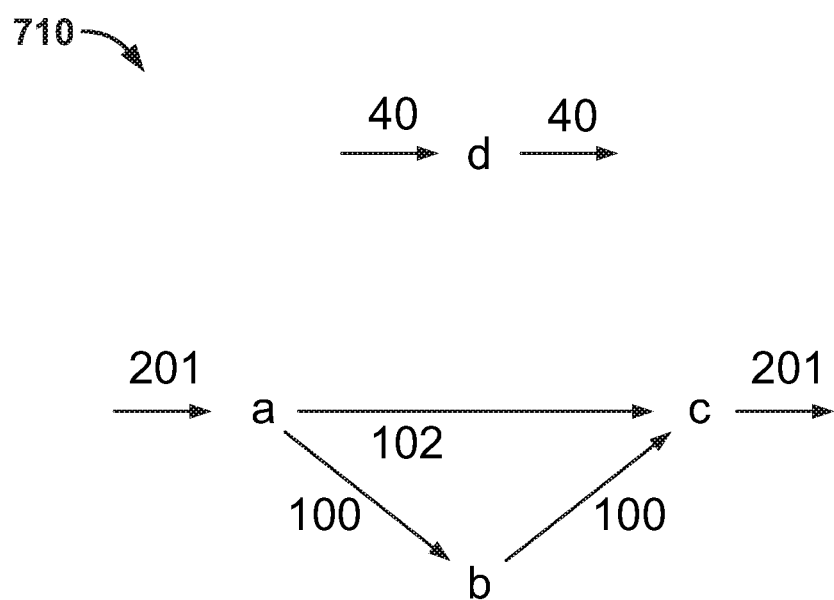
FIG. 7B shows a resulting graph representing the filtered graph shown in FIG. 7A with filtered edges removed, in accordance with one or more embodiments of the invention.

FIG. 7A shows a filtered graph 700 of directly follows graph 600 of FIG. 6, in accordance with one or more embodiments. The dashed edges in filtered graph 700 represent edges that are filtered from directly follows graph 600. The filtering was performed using a filter threshold value f of 93. FIG. 7B shows a resulting graph 710 representing filtered graph 700 with filtered edges removed, in accordance of one or more embodiments.

At step 506, activity relations scores are calculated for relationship operators for pairs of activities in the event log based on the filtered directly follows graph and the filtered indirectly follows graph. The relationship operators for a pair of activities a and b may include one or more (e.g., all) of an exclusive choice relationship operator (denoted $\underline{x}$), a sequence relationship operator (denoted $\underline{\rightarrow}$), a parallel relationship operator (denoted $\underline{\wedge}$), a loop entry and loop exit relationship operator (denoted $\underline{\circlearrowleft_s}$), and an indirect loop relationship operator (denoted $\underline{\circlearrowleft_i}$). A loop entry and loop exit relationship operator for a and b refers to entry or exit of a loop from a to b. An indirect loop relationship operator for a and b refers to a strictly indirect relation between a and b within a loop. Other relationship operators are also contemplated.

The activity relations scores represent the probability that a relationship operator exists between a and b. The activity relation scores are calculated based on a frequency of occurrence of directly follows relations and/or indirectly follows relations between a and b determined using the filtered directly follows graph and/or the filtered indirectly follows graph. As explained with respect to FIG. 8, the frequency of occurrence may be used to infer the existence of relationship operators.

Figure 8:
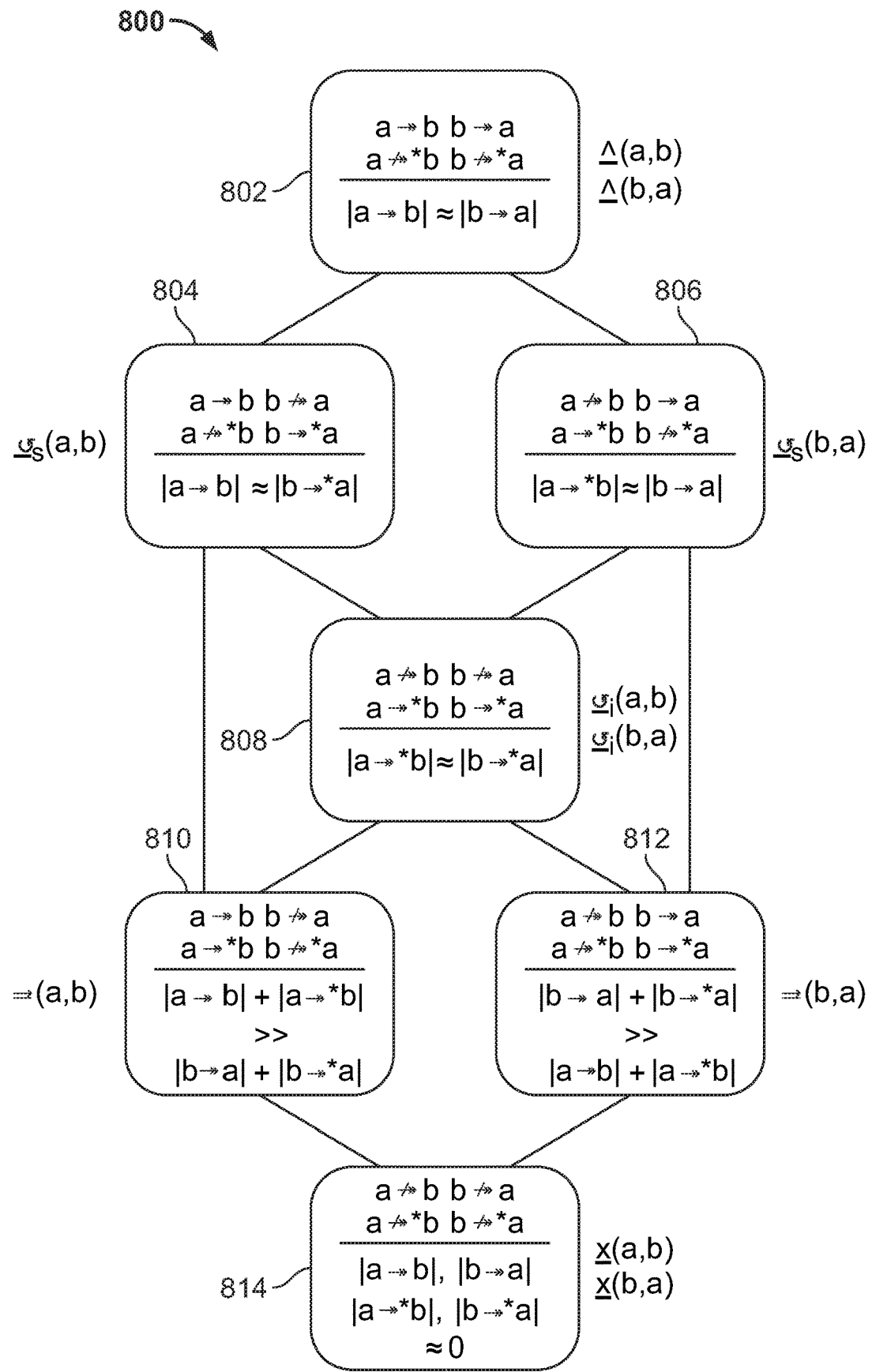
FIG. 8 shows a diagram illustrating the contribution of frequency information for inferring relationship operators for a pair of activities, in accordance with one or more embodiments of the invention.

FIG. 8 shows a diagram 800 illustrating the contribution of frequency information for inferring relationship operators for a pair of activities a and b, in accordance with one or more embodiments. In each block 802-814, information above the horizontal lines show the directly follows relations (denoted a→b) and the strictly indirectly follows relations (denoted a→*b) contributing to inference of a relationship operator and the information below the horizontal line shows frequency information contributing to inference of the relationship operator.

As shown in block 814, an exclusive choice relationship operator between a and b can be inferred when the frequency of directly follows relations and strictly indirectly follows relations between a and b is relatively small (e.g., near zero), and vice versa for the exclusive choice relationship operator between b and a. As shown in block 810, a sequence relationship operator from a to b can be inferred when the frequency of directly follows relations and strictly indirectly follows relations from a to b is much larger than the frequency of those from b to a, and vice versa for the sequence relationship operator from b to a as shown in block 812. As shown in block 802, a parallel relationship operator between a and b can be inferred when the frequency of directly follows relations from a to b is approximately the same as the frequency of directly follows relations from b to a. As shown in block 804, a loop entry and loop exit relationship operator from a to b can be inferred when the frequency of directly follows relations from a to b is approximately the same as to the frequency of strictly indirectly follows relations from b to a, and vice versa for the loop entry and loop exit relationship operator from b to a as shown in block 806. As shown in block 808, the indirect loop relationship operator between a and b can be inferred when the frequency of strictly indirectly follows relations from a to b is approximately the same as the frequency of strictly indirectly follows relations from b to a.

The contribution of frequency information to infer relationship operators, as shown in FIG. 8, is utilized to generate formulas for calculating activity relation scores for each relationship operator for each pair of activities a and b in the event log. In one embodiment, the values of the activity relation scores for each relationship operator are within a range of 0 to 1. However, the values of the activity relation scores may represented in any suitable form. Let $|a|$ and $|b|$ denote the respective frequencies of activities a and b, $|a \twoheadrightarrow b|$ denote the frequency of directly follows relations from a to b, and $|a \twoheadrightarrow {}^*b|$ denote the frequency of strictly indirectly follows relations from a to b.

The activity relation score $s_x$ for the exclusive choice relationship operator between a and b is calculated according to Equation (1) as follows:

$$s_x(a,b) = \frac{\frac{|a| - (|a \twoheadrightarrow b| + |b \twoheadrightarrow a| + |a \twoheadrightarrow {}^*b| + |b \twoheadrightarrow {}^*a|)}{|a|} + \frac{|b| - (|a \twoheadrightarrow b| + |b \twoheadrightarrow a| + |a \twoheadrightarrow {}^*b| + |b \twoheadrightarrow {}^*a|)}{|b|}}{2}$$

Equation (1)

Equation (1) compares the frequency of a and b (i.e., $|a|$ and $|b|$) to the frequency when they are in relation with each other (i.e., $|a \twoheadrightarrow b| + |b \twoheadrightarrow a| + |a \twoheadrightarrow b| + |b \twoheadrightarrow a|$) in the filtered directly follows graph and the filtered indirectly follows graph. Equation (1) expresses the frequency of a and b not occurring together in the same traces, which implies that only either a or b should be present and, by extent, exclusive choice. The activity relation score $s_x$ is expressed as the difference between the frequency of the activity (a or b) and the frequency they are in relation with each other, normalized against the average occurrences of a and b. The less frequent that a and b are in relation with each other, the higher the activity relation score $s_x$, indicating a higher likelihood that an exclusive choice relationship operator exists between a and b. The more frequency that a and b are in relation with each other, the lower the activity relation score $s_x$, indicating a lower likelihood that an exclusive choice relationship operator exists between a and b.

The activity relation score $s_\rightarrow$ for the sequence relationship operator between a and b is calculated according to Equation (2) as follows:

$$s_\rightarrow(a,b) = \frac{|a \twoheadrightarrow b| + |a \twoheadrightarrow {}^*b| - |b \twoheadrightarrow a| + |b \twoheadrightarrow {}^*a|}{|a \twoheadrightarrow b| + |a \twoheadrightarrow {}^*b| + |b \twoheadrightarrow a| + |b \twoheadrightarrow {}^*a| + 1}$$

Equation (2)

Equation (2) compares the relations in one direction (i.e., $|a \twoheadrightarrow b| + |a \twoheadrightarrow {}^*b|$) to relations in the other direction (i.e., $|b \twoheadrightarrow a| + |b \twoheadrightarrow {}^*a|$), and normalizes the amount against their combined frequencies (i.e., $|a \twoheadrightarrow b| + |a \twoheadrightarrow {}^*b| + |b \twoheadrightarrow a| + |b \twoheadrightarrow {}^*a|$). If the first direction (i.e., a to b) is dominant, the activity relation score $s_\rightarrow$ will be between 0 and 1. If the other direction (i.e., b to a) is dominant, the activity relation score $s_\rightarrow$ will be between −1 to 0. Equation (2) has the property that for any activities a and b, $s_\rightarrow(a,b) = -s_\rightarrow(b,a)$. This property is used to calculate both $s_\rightarrow(a,b)$ and $s_\rightarrow(b,a)$ with a single calculation. To keep the activity relation score $s_\rightarrow$ within the 0 to 1 range, negative scores are rounded to 0.

The activity relation score $s_\wedge$ for the parallel relationship operator between a and b is calculated according to Equation (3) as follows:

$$s_\wedge(a,b) = \min\left(\frac{|a \twoheadrightarrow b|}{|b \twoheadrightarrow a|}, \frac{|b \twoheadrightarrow a|}{|a \twoheadrightarrow b|}\right)$$

Equation (3)

Equation (3) compares the direct relations between a and b. The closer in value $|a \twoheadrightarrow b|$ and $|b \twoheadrightarrow a|$ are, the more likely a and b are in a parallel relationship and the higher the activity relation score $s_\wedge$. If both values for $|a \twoheadrightarrow b|$ and $|b \twoheadrightarrow a|$ are approximately equal in value, then the activity relation score $s_\wedge$ is close to 1. If the values of $|a \twoheadrightarrow b|$ and $|b \twoheadrightarrow a|$ are different, then the minimum of $$\frac{|a \twoheadrightarrow b|}{|b \twoheadrightarrow a|}$$

and $$\frac{|b \twoheadrightarrow a|}{|a \twoheadrightarrow b|}$$

determines the activity relation score $s_\wedge$ to ensure that the score falls within the range of 0 to 1.

The activity relation score $s_{\circlearrowleft_s}$ for the loop entry and loop exit relationship between a and b and the activity relation score $s_{\circlearrowleft_i}$ for the indirect loop relationship between a and b are calculated according to Equation (4) and Equation (5), respectively, as follows:

$$s_{\circlearrowleft_s}(a,b) = \min\left(\frac{|a \twoheadrightarrow b|}{|b \twoheadrightarrow {}^*a|}, \frac{|b \twoheadrightarrow {}^*a|}{|a \twoheadrightarrow b|}\right)$$

Equation (4)

$$s_{\circlearrowleft_i}(a,b) = \min\left(\frac{|a \twoheadrightarrow {}^*b|}{|b \twoheadrightarrow {}^*a|}, \frac{|b \twoheadrightarrow {}^*a|}{|a \twoheadrightarrow {}^*b|}\right)$$

Equation (5)

Equation (4) allows for the identification of the redo portion of a loop, where the loop repeats from activity a at an end of an iteration to activity b at the beginning of a next iteration. Equation (5) allows for the identification of activities in a strictly indirect relation within a loop. These notations of loop behavior cannot be aggregated into a single heuristic and are therefore evaluation separately. In Equation (4), the frequency of entering the redo portion of a loop is expressed is $|a \twoheadrightarrow b|$. If b is a redo activity, which is executed $|a \twoheadrightarrow b|$ times, a path returning from redo activity b to activity a is expected in the redo body $|b \twoheadrightarrow {}^*a|$ with a similar frequency. This would indicate that a and b are in a loop entry and loop exit relationship. Exiting the redo portion of the loop can be evaluated in a similar manner by considering $s_{\underline{\circlearrowleft}_s}(a, b)$, where a and b are switched in Equation (4). There can be multiple activities in the loop body and the redo portion of the loop. The loop entry and loop exit relationship $s_{\underline{\circlearrowleft}_s}(a, b)$ indicates activity a in the loop body directly precedes an activity b in the redo portion, however this is not the case for all activities in the loop body or in the redo portion. Equation (5) provides for the evaluation of activities in an indirect loop. In an indirect loop, a and b strictly indirectly follow (i.e., $|a \twoheadrightarrow {}^*b|$) and strictly indirectly precede (i.e., $|b \twoheadrightarrow {}^*a|$) each other and, since this is a looping structure, the frequencies are expected to be similar.

Returning to FIG. 5, at step 508, a cut location in the event log and a relationship operator node are determined based on the activity relation scores. The cut location splits the event log $\Sigma$ into sub-event logs $\Sigma_1$ and $\Sigma_2$. The relationship operator node represents the behavior between the sub-event logs and may include, e.g., exclusive choice, sequence, parallel, or loop. The cut location is determined by evaluating all potential cut locations in the event log $\Sigma$ based on the accumulated activity relation scores for each relationship operator (i.e., exclusive choice relationship operator, sequence relationship operator, parallel relationship operator, loop entry and loop exit relationship operator, and indirect loop relationship operator). In one embodiment, a cut score is calculated for each relationship operator and for each potential cut location in the event log $\Sigma$. The potential cut locations include the transition between each pair of activities in the event log. The cut location and the relationship operator node are determined based on the cut scores.

The cut scores are calculated by first determining accumulated scores for a particular relationship operator. The accumulated scores for the exclusive choice relationship operator, sequence relationship operator, and parallel relationship operator are determined by calculating the average activity relation score over each pair of activities in potential sub-event logs $\Sigma_1$ and $\Sigma_2$ for each potential cut location. Let $c=(\oplus, \Sigma_1, \Sigma_2)$ be a cut with $\oplus \in \{x, \rightarrow, \wedge\}$. Then $s_\oplus(\Sigma_1, \Sigma_2)$ denotes an accumulation score of cut c as follows:

$$s_\oplus\left(\sum\nolimits_1, \sum\nolimits_2\right) = \frac{\sum_{a \in \Sigma_1, b \in \Sigma_2} s_\oplus(a,b)}{|\Sigma_1| \cdot |\Sigma_2|} \quad \text{Equation (6)}$$

In one example, the accumulation score for cut $c=(\rightarrow, \{a, b\}, \{c, d\})$ is the average over the activity relations scores $s_\rightarrow(a, c)$, $s_\rightarrow(a, d)$, $s_\rightarrow(b, c)$, and $s_\rightarrow(b, d)$.

The accumulation scores for loop behavior are based on the combination of activity relation scores for the loop entry and loop exit relationship operator and the indirect loop relationship operator. Loop behavior comprises three parts: a $\text{redo}_{start}$ part, a $\text{redo}_{end}$ part, and an indirect part. As the body of a loop is exited, the redo part of the loop is entered, which signals a repetition of the loop. The $\text{redo}_{start}$ part of a loop represents the collection of activity pairs of which the first activity of the $\text{redo}_{start}$ part is the last activity of the body and the second activity of the $\text{redo}_{start}$ part is the first activity of the redo part. Once the redo part is over, the body is looped over. The $\text{redo}_{end}$ part of a loop represents the collection of activity pairs of which the first activity of the $\text{redo}_{end}$ part is a last activity of the redo part and the second activity is a first activity of the body. The indirect part of a loop represents activity pairs in the loop that are not within the $\text{redo}_{start}$ part or the $\text{redo}_{end}$ part. The activity pairs in the indirect part follow each other strictly indirectly. The accumulation score $s_\circlearrowleft(\Sigma_1, \Sigma_2, S_2, E_2)$ for a loop, where redo start activities is denoted $S_2$, redo end activities is denoted $E_2$, and $S_2, E_2 \subseteq \Sigma_2$, is as follows:

$$s_\circlearrowleft\left(\sum\nolimits_1, \sum\nolimits_2, S_2, E_2\right) = \frac{\text{redo}_{start} + \text{redo}_{end} + \text{indirect}}{|\text{redo}_{start}| + |\text{redo}_{end}| + |\text{indirect}|} \quad \text{Equation (7)}$$

where:

$$\text{redo}_{start} = \sum\nolimits_{(a,b) \in \text{End}(L) \times S_2} s_{\underline{\circlearrowleft}_s}(a, b) \quad \text{Equation (8)}$$

$$\text{redo}_{end} = \sum\nolimits_{(a,b) \in E_2 \times \text{Start}(L)} s_{\underline{\circlearrowleft}_s}(a, b) \quad \text{Equation (9)}$$

$$\text{indirect} = \sum\nolimits_{(a,b) \notin (\text{End}(L) \times S_2) \cup (E_2 \times \text{Start}(L))} s_{\underline{\circlearrowleft}_i}(a, b) \quad a \in \sum\nolimits_1, b \in \sum\nolimits_2 \quad \text{Equation (10)}$$

and where the number of activity pairs is determined as follows:

$$|\text{redo}_{start}| = |(a,b) \in \text{End}(L) \times S_2| \quad \text{Equation (11)}$$

$$|\text{redo}_{end}| = |(a,b) \in E_2 \times \text{Start}(L)| \quad \text{Equation (12)}$$

$$|\text{indirect}| = |a \in \Sigma_1, b \in \Sigma_2, (a,b) \in (\text{End}(L) \times S_2) \cup (E_2 \times \text{Start}(L))| \quad \text{Equation (13)}$$

Although the accumulation score $s_\circlearrowleft(\Sigma_1, \Sigma_2, S_2, E_2)$ for a loop resembles averaging of scores, this is not the case. The number of pairs in $|\Sigma_1| \cdot |\Sigma_2|$ is not necessarily equal to the number of activity relation scores that are summed in $\text{redo}_{start} + \text{redo}_{end} + \text{indirect}$, making the division by $|\Sigma_1| \cdot |\Sigma_2|$ not a true average.

Silent loops, denoted $\circlearrowleft_\tau$, have a redo size of zero. A redo size of zero refers to a loop where the redo part of the loop (that must be executed in order for the loop body to be repeated) does not include any activities. The accumulation score $s_{\circlearrowleft_\tau}(\Sigma)$ for silent loops over event log $\Sigma$ is as follows:

$$s_{\circlearrowleft_\tau}\left(\sum\nolimits\right) = \sum\nolimits_{(a,b) \in \text{End}(L) \times \text{Start}(L)} s_{\underline{\circlearrowleft}_s}(a, b) \quad a \in \sum\nolimits_1, b \in \sum\nolimits_2 \quad \text{Equation (14)}$$

The accumulation scores do not always accurately identify the correct relationship operator. Accordingly, in one embodiment, the accumulation scores are modified to determine the cut scores.

For the exclusive choice relationship operator and the sequence relationship operator, the activity relation scores tend to be higher than for the other relationship operators. To address this, the standard deviation of the activity relation scores for the exclusive choice relationship operator and the sequence relationship operator is utilized to give more weight to seemingly outlying activity relation scores. The standard deviation allows for the detection of high variance in a set of scores, and by extension, outlying score values. The higher the standard deviation is, the more variance there is in the set of scores. The standard deviation is applied by subtracting it from the accumulation score. The modified accumulation score $s_\oplus^m(\Sigma_1, \Sigma_2)$ for the exclusive choice relationship operator and the sequence relationship operator for cut $c=(\oplus, \Sigma_1, \Sigma_2)$ with $\oplus \in \{x, \rightarrow\}$ is as follows:

$$s_\oplus^m(\Sigma_1,\Sigma_2)=s_\oplus(\Sigma_1,\Sigma_2)-\sigma(\{s_\oplus(a,b)|a\in\Sigma_1,b\in\Sigma_2\})  \quad \text{Equation (15)}$$

where $s_\oplus(\Sigma_1,\Sigma_2)$ is the accumulation score for the exclusive choice relationship operator and the sequence relationship operator (Equation (6)) and $\sigma(S)$ denotes the standard deviation of a multiset of values S.

The parallel relationship operator and the loop operators are similar on an activity relation level. The activity relation scores for the parallel relation operator and the loop operators depend on activities following each other in both directions with approximately equal frequency. Accordingly, the parallel relationship operator and the loop operators are difficult to differentiate. To better differentiate between parallel and looping behavior, the accumulated score is modified based on activities occurring multiple times per trace as activities occurring multiple times per trace is evidence of looping behavior. A modifier $mod_{para}$ that assesses the likelihood of parallel behavior and a modifier $mod_{loop}$ that assesses the likelihood of looping behavior are defined by comparing the number of traces with the average frequency of activities as follows:

$$mod_{para} = \min\left(\frac{|L|}{\left(\frac{\|L\|}{|\Sigma|}\right)}, 1\right) \quad \text{Equation (16)}$$

$$mod_{loop} = 2 - mod_{para} \quad \text{Equation (17)}$$

where L denotes the collection of traces in an event log, $|L|$ is the number of traces in the event log, $\|L\|$ is the total number of events in the event log, $\Sigma$ denotes all unique activities in the event log, and $|\Sigma|$ is the number of unique events.

The modified accumulation score $s_\wedge^m(\Sigma_1,\Sigma_2)$ for cut $c=(\wedge, \Sigma_1, \Sigma_2)$ for a parallel relationship operator is as follows:

$$S_\wedge^m(\Sigma_1,\Sigma_2)=S_\wedge(\Sigma_1,\Sigma_2)\cdot mod_{para} \quad \text{Equation (18)}$$

The modified accumulation score $s_\circlearrowleft^m(\Sigma_1,\Sigma_2)$ for cut $c=(\circlearrowleft, \Sigma_1, \Sigma_2)$ for a loop operator is as follows:

$$s_\circlearrowleft^m(\Sigma_1,\Sigma_2,S_2,E_2)= S_\circlearrowleft(\Sigma_1,\Sigma_2,S_2,E_2)\cdot mod_{loop} \quad \text{Equation (19)}$$

The modified accumulation score $s_{\circlearrowleft_\tau}^m(\Sigma_1,\Sigma_2)$ for a silent loop over $\Sigma$ is as follows:

$$s_{\circlearrowleft_\tau}^m(\Sigma)= S_{\circlearrowleft_\tau}(\Sigma)\cdot mod_{loop} \quad \text{Equation (20)}$$

In Equation (16), the modifier $mod_{para}$ is a measure of how many times the activities averagely occur $$\left(\frac{\|L\|}{|\Sigma|}\right)$$

per trace $|L|$. The more repetition of activities there is in the traces, the lower $mod_{para}$ becomes. $mod_{para}$ is bounded to be at most 1, as activities occurring less than once per trace on average is not evidence of parallel behavior per se.

The accumulated scores are all within the range of [0,1], which enables comparison between the modified accumulated scores. With the modification of the accumulated scores, this property no longer holds. However, as no further calculations or modifications are performed on the modified accumulated scores, the modified accumulated scores exceeding the [0,1] range has no impact.

The cut location and the relationship operator node are determined from the potential cut locations based on the cut scores. In one embodiment, the cut location and the relationship operator node are determined as the potential cut location for a particular relationship operator with the highest cut score.

At step 510, the event log is split into sub-event logs based on the cut location. To split the event log, traces of the event log are split according to the cut location. In one embodiment, traces that do not fit with the cut location are considered empty traces. The number of empty traces is tracked by the empty behavior counter. The empty behavior counter is incremented during log splitting and is reset when the event log is recursed upon during the skip log base case (at step 204 of FIG. 2).

Figure 9:
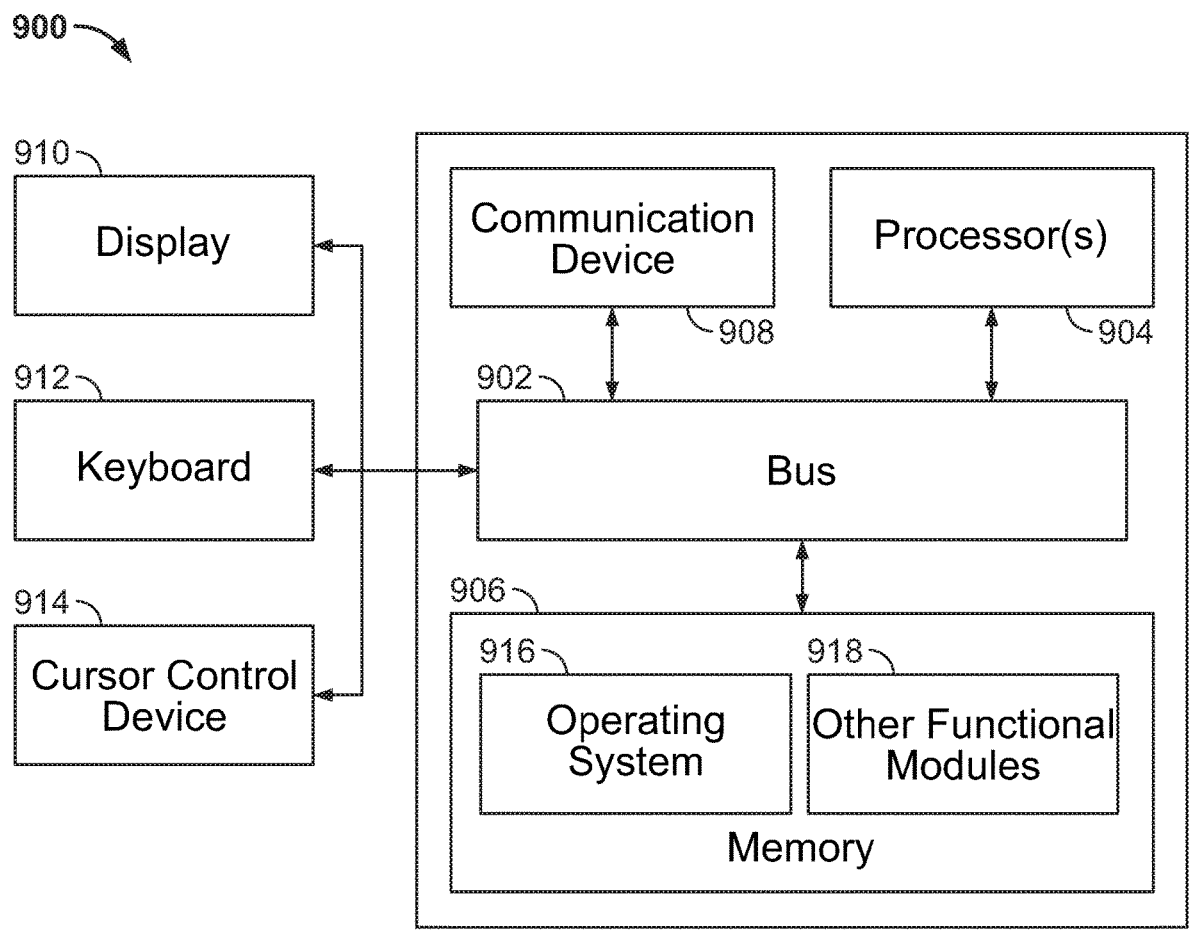
FIG. 9 is a block diagram of a computing system according to an embodiment of the invention.

FIG. 9 is a block diagram illustrating a computing system 900 configured to execute the methods, workflows, and processes described herein, including FIGS. 2 and 5, according to an embodiment of the present invention. In some embodiments, computing system 900 may be one or more of the computing systems depicted and/or described herein. Computing system 900 includes a bus 902 or other communication mechanism for communicating information, and processor(s) 904 coupled to bus 902 for processing information. Processor(s) 904 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 904 may also have multiple processing cores, and at least some of the cores may be configured to perform specific functions. Multi-parallel processing may be used in some embodiments.

Computing system 900 further includes a memory 906 for storing information and instructions to be executed by processor(s) 904. Memory 906 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 904 and may include volatile media, non-volatile media, or both. The media may also be removable, non-removable, or both.

Additionally, computing system 900 includes a communication device 908, such as a transceiver, to provide access to a communications network via a wireless and/or wired connection according to any currently existing or future-implemented communications standard and/or protocol.

Processor(s) 904 are further coupled via bus 902 to a display 910 that is suitable for displaying information to a user. Display 910 may also be configured as a touch display and/or any suitable haptic I/O device.

A keyboard 912 and a cursor control device 914, such as a computer mouse, a touchpad, etc., are further coupled to bus 902 to enable a user to interface with computing system. However, in certain embodiments, a physical keyboard and mouse may not be present, and the user may interact with the device solely through display 910 and/or a touchpad (not shown). Any type and combination of input devices may be used as a matter of design choice. In certain embodiments, no physical input device and/or display is present. For instance, the user may interact with computing system 900 remotely via another computing system in communication therewith, or computing system 900 may operate autonomously.

Memory 906 stores software modules that provide functionality when executed by processor(s) 904. The modules include an operating system 916 for computing system 900 and one or more additional functional modules 918 configured to perform all or part of the processes described herein or derivatives thereof.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like. A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention. Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The foregoing merely illustrates the principles of the disclosure. It will thus be appreciated that those skilled in the art will be able to devise various arrangements that, although not explicitly described or shown herein, embody the principles of the disclosure and are included within its spirit and scope. Furthermore, all examples and conditional language recited herein are principally intended to be only for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future.

What is claimed is:

1. A computer implemented method for generating a process tree of a process, comprising:
   receiving an event log of the process;
   determining whether a base case applies to the event log and, in response to determining that the base case applies to the event log, adding one or more nodes to the process tree;
   in response to determining that the base case does not apply to the event log, splitting the event log into sub-event logs based on a frequency of directly follows relations and a frequency of strictly indirectly follows relations for pairs of activities in the event log and adding one or more nodes to the process tree;
   repeating the determining and the splitting for each respective sub-event log using the respective sub-event log as the event log until it is determined that the base case applies to the event log; and
   outputting the process tree.

2. The computer implemented method of claim 1, wherein splitting the event log into sub-event logs based on a frequency of directly follows relations and a frequency of strictly indirectly follows relations for pairs of activities in the event log and adding one or more nodes to the process tree comprises:
   generating a directly follows graph of the event log and an indirectly follows graph of the event log;
   filtering the directly follows graph and the indirectly follows graph;
   calculating activity relation scores for relationship operators for pairs of activities in the event log based on the filtered directly follows graph and the filtered indirectly follows graph;
   determining, based on the activity relation scores, 1) a cut location in the event log and 2) a relationship operator node representing behavior between the sub-event logs; and
   splitting the event log into the sub-event logs based on the cut location.

3. The computer implemented method of claim 2, wherein filtering the directly follows graph and the indirectly follows graph comprises:
   sorting pairs of activities in the event log that are in directly follows relation or strictly indirectly follows relation;
   identifying pairs of activities in the sorted pairs of activities based on a filter threshold value; and
   removing edges connecting the identified pairs of activities in the directly follows graph and the indirectly follows graph.

4. The computer implemented method of claim 3, wherein the filter threshold value is user defined.

5. The computer implemented method of claim 2, wherein determining, based on the activity relation scores, 1) a cut location in the event log and 2) a relationship operator node representing behavior between the sub-event logs comprises:
   calculating cut scores for potential cut locations based on the activity relation scores; and
   determining, based on the cut scores, 1) the cut location from the potential cut locations and 2) the relationship operator node.

6. The computer implemented method of claim 1, wherein splitting the event log into sub-event logs based on a frequency of directly follows relations and a frequency of strictly indirectly follows relations for pairs of activities in the event log and adding one or more nodes to the process tree comprises:
   adding a relationship operator node representing behavior between the sub-event logs and a child node of the relationship operator node for each of the sub-event logs.

7. The computer implemented method of claim 6, wherein adding a relationship operator node representing behavior between the sub-event logs and a child node of the relationship operator node for each of the sub-event logs comprises:
   determining the relationship operator node to be an exclusive choice relationship operator node between a first activity and a second activity when the frequency of directly follows relations and the frequency of strictly indirectly follows relations between the first activity and the second activity is approximately zero.

8. The computer implemented method of claim 6, wherein adding a relationship operator node representing behavior between the sub-event logs and a child node of the relationship operator node for each of the sub-event logs comprises:
   determining the relationship operator node to be a sequence relationship operator node from a first activity to a second activity when the frequency of directly follows relations and the frequency of indirectly follows relations from the first activity to the second activity is larger than the frequency of directly follows relations and the frequency of indirectly follows relations from the second activity to the first activity.

9. The computer implemented method of claim 6, wherein adding a relationship operator node representing behavior between the sub-event logs and a child node of the relationship operator node for each of the sub-event logs comprises:
   determining the relationship operator node to be a parallel relationship operator node between a first activity and a second activity when the frequency of directly follows relations from the first activity to the second activity is approximately the same as the frequency of directly follows relations from the second activity to the first activity.

10. The computer implemented method of claim 6, wherein adding a relationship operator node representing behavior between the sub-event logs and a child node of the relationship operator node for each of the sub-event logs comprises:
   determining the relationship operator node to be a loop entry and loop exit operator node from a first activity to a second activity when the frequency of directly follows relations from the first activity to the second activity is approximately the same as the frequency of strictly indirectly follows relations from the second activity to the first activity.

11. The computer implemented method of claim 6, wherein adding a relationship operator node representing behavior between the sub-event logs and a child node of the relationship operator node for each of the sub-event logs comprises:
   determining the relationship operator node to be an indirect loop relationship operator node between a first activity and a second activity when the frequency of strictly indirectly follows relations from the first activity to the second activity is approximately the same as the frequency of strictly indirectly follows relations from the second activity to the first activity.

12. The computer implemented method of claim 1, wherein determining whether a base case applies to the event log and, in response to determining that the base case applies to the event log, adding one or more nodes to the process tree comprises:
   determining that a skip log case applies to the event log; and
   in response to determining that the skip log case applies to the event log, adding an exclusive choice node to the process tree with a first child node representing a silent activity and a second child node for the event log.

13. The computer implemented method of claim 1, further comprising:
   generating a process model based on the process tree.

14. The computer implemented method of claim 1, wherein the process is a robotic process automation process.

15. An apparatus comprising:
   a memory storing computer instructions for generating a process tree of a process; and
   at least one processor configured to execute the computer instructions, the computer instructions configured to cause the at least one processor to perform operations of:
      receiving an event log of the process;
      determining whether a base case applies to the event log and, in response to determining that the base case applies to the event log, adding one or more nodes to the process tree;
      in response to determining that the base case does not apply to the event log, splitting the event log into sub-event logs based on a frequency of directly follows relations and a frequency of strictly indirectly follows relations for pairs of activities in the event log and adding one or more nodes to the process tree;
      repeating the determining and the splitting for each respective sub-event log using the respective sub-event log as the event log until it is determined that the base case applies to the event log; and
      outputting the process tree.

16. The apparatus of claim 15, wherein splitting the event log into sub-event logs based on a frequency of directly follows relations and a frequency of strictly indirectly follows relations for pairs of activities in the event log and adding one or more nodes to the process tree comprises:
   generating a directly follows graph of the event log and an indirectly follows graph of the event log;
   filtering the directly follows graph and the indirectly follows graph;
   calculating activity relation scores for relationship operators for pairs of activities in the event log based on the filtered directly follows graph and the filtered indirectly follows graph;
   determining, based on the activity relation scores, 1) a cut location in the event log and 2) a relationship operator node representing behavior between the sub-event logs; and splitting the event log into the sub-event logs based on the cut location.

17. The apparatus of claim 16, wherein filtering the directly follows graph and the indirectly follows graph comprises:
sorting pairs of activities in the event log that are in directly follows relation or strictly indirectly follows relation;
identifying pairs of activities in the sorted pairs of activities based on a filter threshold value; and
removing edges connecting the identified pairs of activities in the directly follows graph and the indirectly follows graph.

18. The apparatus of claim 17, wherein the filter threshold value is user defined.

19. The apparatus of claim 16, wherein determining, based on the activity relation scores, 1) a cut location in the event log and 2) a relationship operator node representing behavior between the sub-event logs comprises:
calculating cut scores for potential cut locations based on the activity relation scores; and
determining, based on the cut scores, 1) the cut location from the potential cut locations and 2) the relationship operator node.

20. The apparatus of claim 15, wherein splitting the event log into sub-event logs based on a frequency of directly follows relations and a frequency of strictly indirectly follows relations for pairs of activities in the event log and adding one or more nodes to the process tree comprises:
adding a relationship operator node representing behavior between the sub-event logs and a child node of the relationship operator node for each of the sub-event logs, wherein adding a relationship operator node representing behavior between the sub-event logs and a child node of the relationship operator node for each of the sub-event logs comprises:
determining the relationship operator node to be an exclusive choice relationship operator node between a first activity and a second activity when the frequency of directly follows relations and the frequency of strictly indirectly follows relations between the first activity and the second activity is approximately zero.

21. The apparatus of claim 15, wherein splitting the event log into sub-event logs based on a frequency of directly follows relations and a frequency of strictly indirectly follows relations for pairs of activities in the event log and adding one or more nodes to the process tree comprises:
adding a relationship operator node representing behavior between the sub-event logs and a child node of the relationship operator node for each of the sub-event logs, wherein adding a relationship operator node representing behavior between the sub-event logs and a child node of the relationship operator node for each of the sub-event logs comprises:
determining the relationship operator node to be a sequence relationship operator node from a first activity to a second activity when the frequency of directly follows relations and the frequency of indirectly follows relations from the first activity to the second activity is larger than the frequency of directly follows relations and the frequency of indirectly follows relations from the second activity to the first activity.

22. The apparatus of claim 15, wherein splitting the event log into sub-event logs based on a frequency of directly follows relations and a frequency of strictly indirectly follows relations for pairs of activities in the event log and adding one or more nodes to the process tree comprises:
adding a relationship operator node representing behavior between the sub-event logs and a child node of the relationship operator node for each of the sub-event logs, wherein adding a relationship operator node representing behavior between the sub-event logs and a child node of the relationship operator node for each of the sub-event logs comprises:
determining the relationship operator node to be a parallel relationship operator node between a first activity and a second activity when the frequency of directly follows relations from the first activity to the second activity is approximately the same as the frequency of directly follows relations from the second activity to the first activity.

23. The apparatus of claim 15, wherein splitting the event log into sub-event logs based on a frequency of directly follows relations and a frequency of strictly indirectly follows relations for pairs of activities in the event log and adding one or more nodes to the process tree comprises:
adding a relationship operator node representing behavior between the sub-event logs and a child node of the relationship operator node for each of the sub-event logs, wherein adding a relationship operator node representing behavior between the sub-event logs and a child node of the relationship operator node for each of the sub-event logs comprises:
determining the relationship operator node to be a loop entry and loop exit operator node from a first activity to a second activity when the frequency of directly follows relations from the first activity to the second activity is approximately the same as the frequency of strictly indirectly follows relations from the second activity to the first activity.

24. The apparatus of claim 15, wherein splitting the event log into sub-event logs based on a frequency of directly follows relations and a frequency of strictly indirectly follows relations for pairs of activities in the event log and adding one or more nodes to the process tree comprises:
adding a relationship operator node representing behavior between the sub-event logs and a child node of the relationship operator node for each of the sub-event logs, wherein adding a relationship operator node representing behavior between the sub-event logs and a child node of the relationship operator node for each of the sub-event logs comprises:
determining the relationship operator node to be an indirect loop relationship operator node between a first activity and a second activity when the frequency of strictly indirectly follows relations from the first activity to the second activity is approximately the same as the frequency of strictly indirectly follows relations from the second activity to the first activity.

25. A non-transitory computer-readable medium storing computer program instructions for generating a process tree of a process, the computer program instructions, when executed on at least one processor, cause the at least one processor to perform operations comprising:
receiving an event log of the process;
determining whether a base case applies to the event log and, in response to determining that the base case applies to the event log, adding one or more nodes to the process tree;
in response to determining that the base case does not apply to the event log, splitting the event log into sub-event logs based on a frequency of directly follows relations and a frequency of strictly indirectly follows relations for pairs of activities in the event log and adding one or more nodes to the process tree;

repeating the determining and the splitting for each respective sub-event log using the respective sub-event log as the event log until it is determined that the base case applies to the event log; and outputting the process tree.

26. The non-transitory computer-readable medium of claim 25, wherein splitting the event log into sub-event logs based on a frequency of directly follows relations and a frequency of strictly indirectly follows relations for pairs of activities in the event log and adding one or more nodes to the process tree comprises:

generating a directly follows graph of the event log and an indirectly follows graph of the event log;

filtering the directly follows graph and the indirectly follows graph;

calculating activity relation scores for relationship operators for pairs of activities in the event log based on the filtered directly follows graph and the filtered indirectly follows graph;

determining, based on the activity relation scores, 1) a cut location in the event log and 2) a relationship operator node representing behavior between the sub-event logs; and splitting the event log into the sub-event logs based on the cut location.

27. The non-transitory computer-readable medium of claim 25, wherein splitting the event log into sub-event logs based on a frequency of directly follows relations and a frequency of strictly indirectly follows relations for pairs of activities in the event log and adding one or more nodes to the process tree comprises:

adding a relationship operator node representing behavior between the sub-event logs and a child node of the relationship operator node for each of the sub-event logs.

28. The non-transitory computer-readable medium of claim 27, wherein adding a relationship operator node representing behavior between the sub-event logs and a child node of the relationship operator node for each of the sub-event logs comprises:

determining the relationship operator node to be an exclusive choice relationship operator node between a first activity and a second activity when the frequency of directly follows relations and the frequency of strictly indirectly follows relations between the first activity and the second activity is approximately zero.

29. The non-transitory computer-readable medium of claim 27, wherein adding a relationship operator node representing behavior between the sub-event logs and a child node of the relationship operator node for each of the sub-event logs comprises:

determining the relationship operator node to be a sequence relationship operator node from a first activity to a second activity when the frequency of directly follows relations and the frequency of indirectly follows relations from the first activity to the second activity is larger than the frequency of directly follows relations and the frequency of indirectly follows relations from the second activity to the first activity.

30. The non-transitory computer-readable medium of claim 27, wherein adding a relationship operator node representing behavior between the sub-event logs and a child node of the relationship operator node for each of the sub-event logs comprises:

determining the relationship operator node to be a parallel relationship operator node between a first activity and a second activity when the frequency of directly follows relations from the first activity to the second activity is approximately the same as the frequency of directly follows relations from the second activity to the first activity.

31. The non-transitory computer-readable medium of claim 27, wherein adding a relationship operator node representing behavior between the sub-event logs and a child node of the relationship operator node for each of the sub-event logs comprises:

determining the relationship operator node to be a loop entry and loop exit operator node from a first activity to a second activity when the frequency of directly follows relations from the first activity to the second activity is approximately the same as the frequency of strictly indirectly follows relations from the second activity to the first activity.

32. The non-transitory computer-readable medium of claim 27, wherein adding a relationship operator node representing behavior between the sub-event logs and a child node of the relationship operator node for each of the sub-event logs comprises:

determining the relationship operator node to be an indirect loop relationship operator node between a first activity and a second activity when the frequency of strictly indirectly follows relations from the first activity to the second activity is approximately the same as the frequency of strictly indirectly follows relations from the second activity to the first activity.

33. The non-transitory computer-readable medium of claim 25, determining whether a base case applies to the event log and, in response to determining that the base case applies to the event log, adding one or more nodes to the process tree comprises:

determining that a skip log case applies to the event log; and in response to determining that the skip log case applies to the event log, adding an exclusive choice node to the process tree with a first child node representing a silent activity and a second child node for the event log.

34. The non-transitory computer-readable medium of claim 25, the operations further comprising:

generating a process model based on the process tree.

35. The non-transitory computer-readable medium of claim 25, wherein the process is a robotic process automation process.

* * * * *

UNITED STATES PATENT AND TRADEMARK OFFICE
CERTIFICATE OF CORRECTION

PATENT NO. : 11,500,756 B2
APPLICATION NO. : 17/013624
DATED : November 15, 2022
INVENTOR(S) : Scheepens et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 249 days.

Signed and Sealed this
Twenty-fifth Day of July, 2023

Katherine Kelly Vidal
*Director of the United States Patent and Trademark Office*